(12) United States Patent
Matsumura et al.

(10) Patent No.: US 10,468,954 B2
(45) Date of Patent: Nov. 5, 2019

(54) SPINDLE MOTOR WITH PARTICULAR ROTOR MAGNET AND STATOR TEETH DIMENSIONS AND DISK DRIVE DEVICE INCLUDING THE SAME

(71) Applicant: Nidec Corporation, Kyoto (JP)

(72) Inventors: Kazuya Matsumura, Kyoto (JP); Yoichi Sekii, Kyoto (JP); Takuro Iguchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/190,446

(22) Filed: Nov. 14, 2018

(65) Prior Publication Data

US 2019/0190363 A1  Jun. 20, 2019

(30) Foreign Application Priority Data

Dec. 15, 2017 (JP) .................. 2017-240426

(51) Int. Cl.
| | | |
|---|---|---|
| G11B 19/20 | (2006.01) | |
| H02K 21/22 | (2006.01) | |
| H02K 1/02 | (2006.01) | |
| H02K 1/27 | (2006.01) | |
| H02K 1/14 | (2006.01) | |

(52) U.S. Cl.
CPC .......... *H02K 21/22* (2013.01); *G11B 19/2009* (2013.01); *H02K 1/02* (2013.01); *H02K 1/14* (2013.01); *H02K 1/146* (2013.01); *H02K 1/2786* (2013.01); *H02K 2213/03* (2013.01)

(58) Field of Classification Search
CPC ....... G11B 19/2009; H02K 1/14; H02K 1/146

USPC ....................................................... 360/99.08
See application file for complete search history.

(56) References Cited

U.S. PATENT DOCUMENTS

| 5,861,696 A | * | 1/1999 | Hartman | H02K 1/2786 |
| | | | | 29/598 |
| 8,599,517 B1 | * | 12/2013 | Abe | G11B 19/2009 |
| | | | | 360/99.08 |
| 8,737,017 B1 | | 5/2014 | Abe | |
| 10,205,354 B2 | * | 2/2019 | Cho | H02K 1/146 |
| 2007/0013255 A1 | * | 1/2007 | Wakitani | H02K 1/146 |
| | | | | 310/216.018 |

(Continued)

FOREIGN PATENT DOCUMENTS

| JP | 08-103059 A | 4/1996 |
| JP | 2000-316240 A | 11/2000 |
| JP | 2014-017999 A | 1/2014 |

*Primary Examiner* — Jefferson A Evans
(74) *Attorney, Agent, or Firm* — Keating & Bennett, LLP (57) ABSTRACT

A spindle motor includes a stationary unit and a rotating unit. The rotating unit is rotatable with respect to the stationary unit in a state in which the stationary unit is aligned with a central axis. The stationary unit includes a stator core and coils. The stator core includes a cylindrical core back and teeth units extending radially outward from an outer circumferential portion of the core back. The coils are defined by a conductive wire wound around each of the teeth units. The rotating unit includes a magnet located radially outside the teeth units. An axial length of the magnet is shorter than an axial length of the teeth unit. A first angle corresponding to a circumferential width of the teeth unit is smaller than a second angle corresponding to a circumferential gap between the adjacent teeth units.

10 Claims, 4 Drawing Sheets

(56) References Cited

U.S. PATENT DOCUMENTS

| | | | |
|---|---|---|---|
| 2011/0148239 A1* | 6/2011 | Nakamura | H02K 21/16 310/156.01 |
| 2011/0176240 A1* | 7/2011 | Tashiro | G11B 19/2009 360/97.11 |
| 2013/0050872 A1* | 2/2013 | Sekii | G11B 25/043 360/99.08 |
| 2013/0099622 A1* | 4/2013 | Oh | G11B 19/2009 310/216.106 |
| 2014/0111884 A1* | 4/2014 | Showa | H02K 21/22 360/99.08 |
| 2014/0139947 A1* | 5/2014 | Abe | H02K 21/22 360/99.08 |
| 2018/0123417 A1* | 5/2018 | Showa | G11B 19/20 |

* cited by examiner

SPINDLE MOTOR WITH PARTICULAR ROTOR MAGNET AND STATOR TEETH DIMENSIONS AND DISK DRIVE DEVICE INCLUDING THE SAME

CROSS REFERENCE TO RELATED APPLICATIONS

This application claims the benefit of priority to Japanese Patent Application No. 2017-240426 filed on Dec. 15, 2017. The entire contents of this application are hereby incorporated herein by reference.

BACKGROUND OF THE INVENTION

1. Field of the Invention

The present disclosure relates to a spindle motor and a disk drive device including the spindle motor.

2. Description of the Related Art

Conventionally, there is known a spindle motor including a stator that generates a rotating magnetic field and a rotor in which magnetic poles of a permanent magnet are arrayed along a circumferential surface of the stator. JP-A 2000-316240 discloses this kind of spindle motor.

A stator of the spindle motor disclosed in JP-A 2000-316240 includes a stator core and a plurality of coils. The stator core is constructed by laminating central closed magnetic circuit discs, a plurality of teeth units extending radially outward from the closed magnetic circuit discs, and a thin circular plate-shaped stator core plates including hammers formed at leading ends of the teeth units. A coil is wound around each of the plurality of teeth units in order to generate a rotating magnetic field. As illustrated in FIG. 3 of JP-A 2000-316240, in the spindle motor, an axial length of the permanent magnet is longer than an axial length of the teeth unit.

However, in the spindle motor disclosed in JP-A 2000-316240, a volume of the permanent magnet, in which material cost tends to be increased, becomes large, so that manufacturing cost of the spindle motor is hardly reduced. For this reason, there is a demand for a spindle motor technology capable of reducing the manufacturing cost without impairing a motor characteristic.

SUMMARY OF THE INVENTION

The present disclosure has been made in view of the above circumstances, and at least one exemplary embodiment of the present disclosure includes a spindle motor technology capable of reducing the manufacturing cost without impairing the motor characteristic.

The problem to be solved by the present disclosure is as described above. The means for solving the problem and the effect will be described below.

According to an aspect of the present disclosure, a spindle motor having the following configuration is provided. That is, the spindle motor is a spindle motor for a rotating body drive device, which includes a stationary unit and a rotating unit. The stationary unit includes a stator. The rotating unit includes a magnet opposed to the stator, and is supported so as to be rotatable about a central axis with respect to the stationary unit. The stator includes a stator core and a plurality of coils. The stator core includes a cylindrical core back centered on the central axis and a plurality of teeth units extending radially outward from an outer circumferential portion of the core back. The plurality of coils are formed by winding a conductive wire around each of the teeth units. The rotating unit includes a magnet located radially outside the teeth unit. An axial length of the magnet is shorter than an axial length of the teeth unit. A first angle corresponding to a circumferential width of the teeth unit is smaller than a second angle corresponding to a circumferential gap between the adjacent teeth units. The magnet is a neodymium bonded magnet. A radial thickness of the magnet ranges from about 0.8 mm to about 1.5 mm. A radial distance between a radially inside surface of the magnet and an outer end surface of the teeth unit ranges from about 0.17 mm to about 0.40 mm. A torque constant of torque generated between the stationary unit and the rotating unit ranges from about 6 mN·m/A to about 13 mN·m/A. A motor constant of the spindle motor ranges from about 5 mN·m/(A·√Ω) to about 10 mN·m/(A·√Ω).

According to the aspect of the present disclosure, the manufacturing cost of the spindle motor is able to be reduced without impairing the motor characteristic of the spindle motor.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, an exemplary embodiment of the present disclosure will be described with reference to the drawings. In the description, sometimes a direction parallel to a rotating axis of a disc is referred to as "axial direction", a direction orthogonal to the rotating axis of the disc is referred to as "radial direction", and a direction along a circular arc centered on the rotating axis of the disc is referred to as "circumferential direction". In the description, sometimes a shape and a positional relationship of each unit are described on the assumption that the axial direction is a vertical direction and that a side on which a cover is attached to a base member is as an upper side It should be noted, however, that the above definition of the vertical direction is not meant to restrict in any way the orientations of the spindle motor and the disk drive device according to the description when in use.

Also, note that the wording "parallel direction" as used in the description comprehends substantially parallel directions. Also, note that the wording "perpendicular direction" as used in the description comprehends substantially perpendicular directions.

<1. Overall Configuration of Disk Drive Device>

Figure 1:
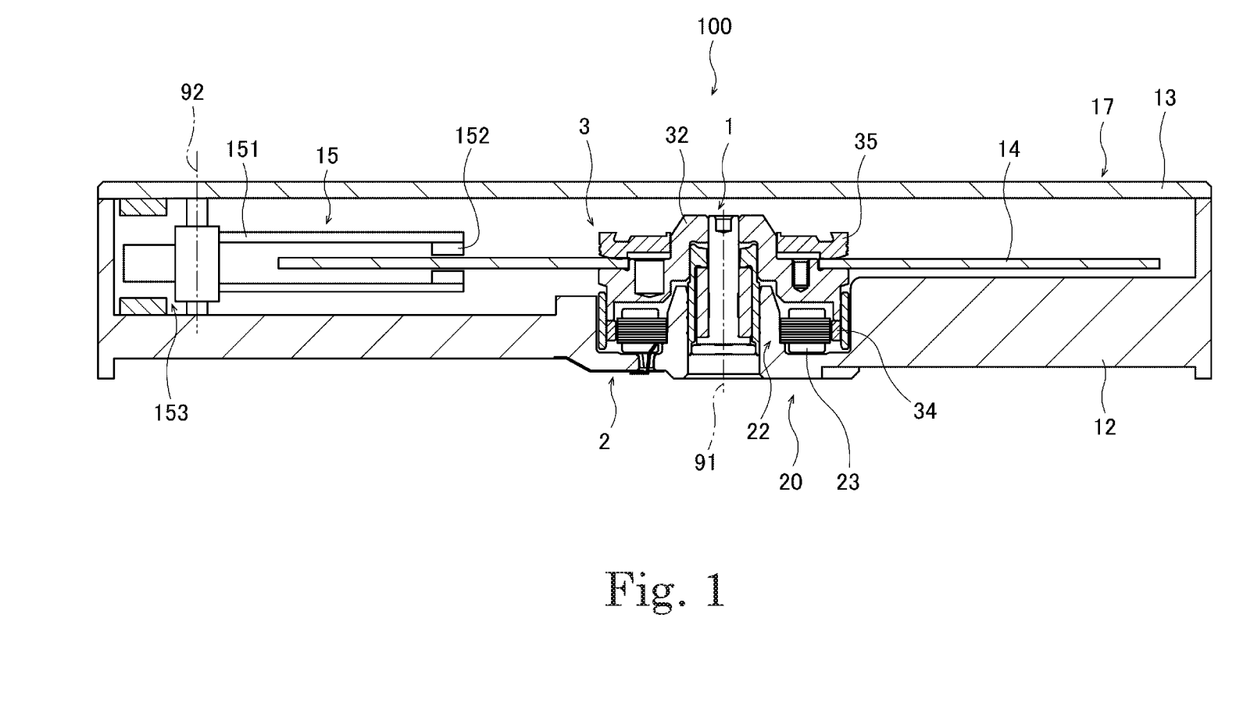
FIG. 1 is a view illustrating a disk drive device according to an exemplary embodiment of the present invention.

Hereinafter, an overall configuration of a disk drive device 100 on which a spindle motor 1 according to an embodiment is mounted will be described with reference to FIG. 1. FIG. 1 is a longitudinal sectional view illustrating the disk drive device 100 of the embodiment.

The disk drive device 100 of the embodiment reads and writes information from and in a disc-shaped magnetic disk (disk, rotating body) 14 including a circular hole in a center while rotationally driving the magnetic disk 14. As illustrated in FIG. 1, the disk drive device 100 mainly includes a spindle motor 1, a base member 12, a cover 13, the magnetic disk 14, and an access unit 15. A housing 17 constituting an outer shell of the disk drive device 100 is constructed with the base member 12 and the cover 13. The spindle motor 1, the magnetic disk 14, the access unit 15, and a clamper 35 (to be described later) are housed in the housing 17.

The magnetic disk 14 of the embodiment is a 3.5-inch type and 1.75 mm-thickness standard product.

The spindle motor 1 rotates the magnetic disk 14 around a first axis 91 while supporting the magnetic disk 14. The spindle motor 1 includes a stationary unit 2 and a rotating unit 3. The stationary unit 2 is stationary relative to the base member 12. A rotating magnetic field is generated in the stationary unit 2. The rotating unit 3 is supported while being rotatable with respect to the stationary unit 2 in a state in which the stationary unit 2 and a center axis (first axis 91) are aligned with each other. The rotating unit 3 is housed in the housing 17. The rotating unit 3 rotates by magnetic flux interaction between the rotating unit 3 and the stationary unit 2. When the rotating unit 3 rotates, the magnetic disk 14 supported by the rotating unit 3 also rotates integrally.

The access unit 15 includes an arm 151, a head 152 provided at a leading end of the arm 151, and a swing mechanism 153. The arm 151 is attached to the base member 12 with a bearing interposed therebetween. The swing mechanism 153 swings the arm 151 and the head 152. When the swing mechanism 153 is driven, the arm 151 swings around a second axis 92. Consequently, the head 152 moves along a recording surface of the magnetic disk 14. The head 152 faces top and bottom surfaces of the magnetic disk 14, and reads and writes the information from and in the rotating magnetic disk 14.

The head 152 may perform either reading or writing of the information from and in the magnetic disk 14. The disk drive device 100 may include at least two magnetic disks 14.

A circuit board (not illustrated) is fixed to the bottom surface of a bottom plate of the base member 12. An electric circuit necessary for driving the disk drive device 100 is mounted on the circuit board. More specifically, an electric circuit necessary for driving the spindle motor 1 is mounted on the circuit board. The circuit board is connected to a coil 23 (to be described later) of the spindle motor 1 through what is called a flexible printed board having large flexibility.

<2. Configuration of Spindle Motor>

Figure 2:
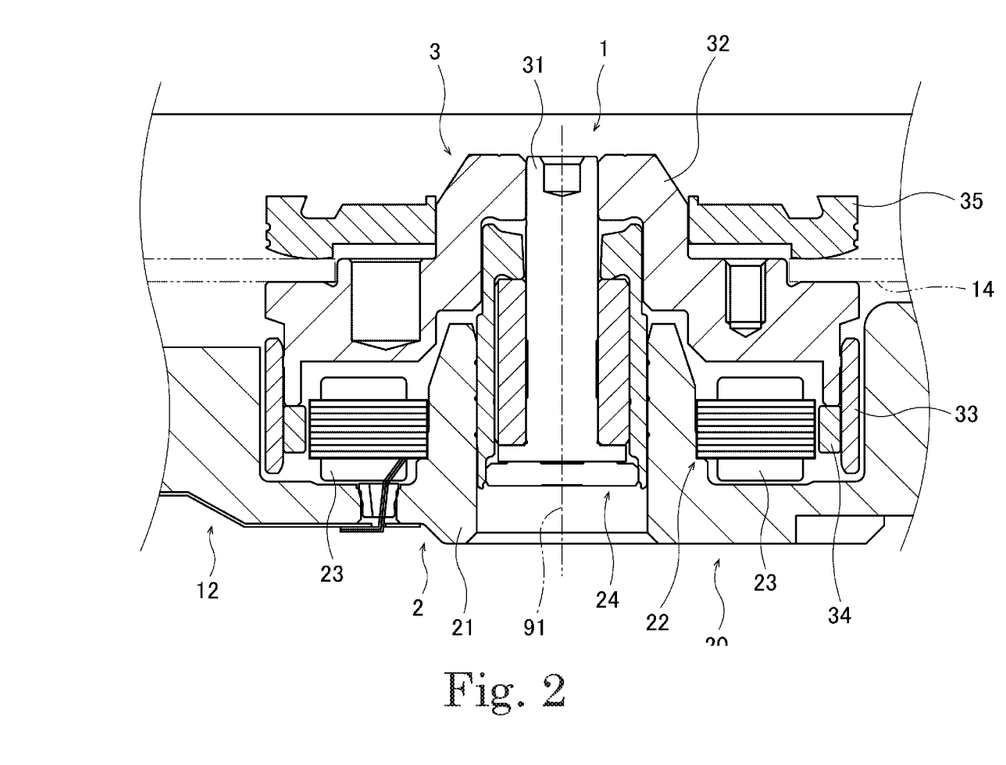
FIG. 2 is a view illustrating a configuration of a spindle motor according to an exemplary embodiment of the present invention.
Figure 3:
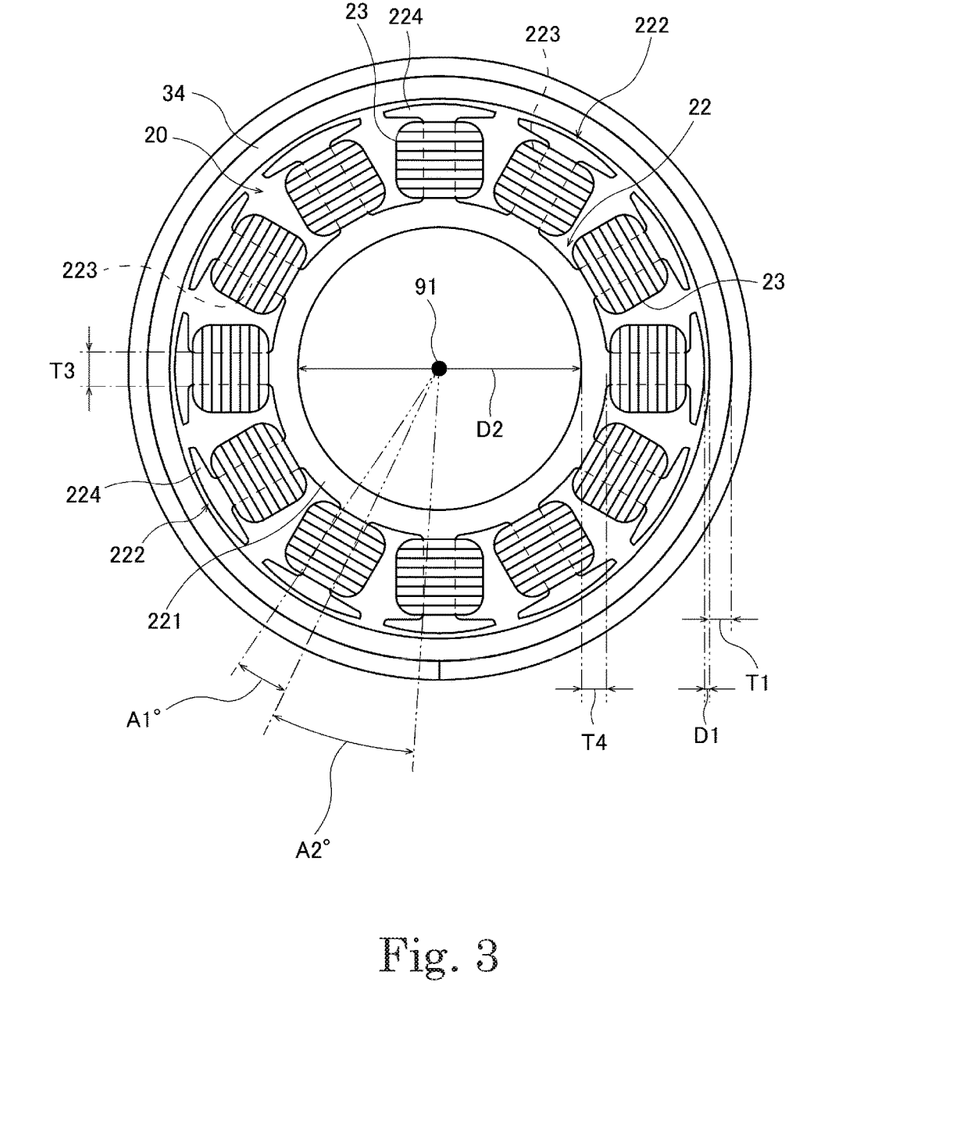
FIG. 3 is a perspective view of a stator.
Figure 4:
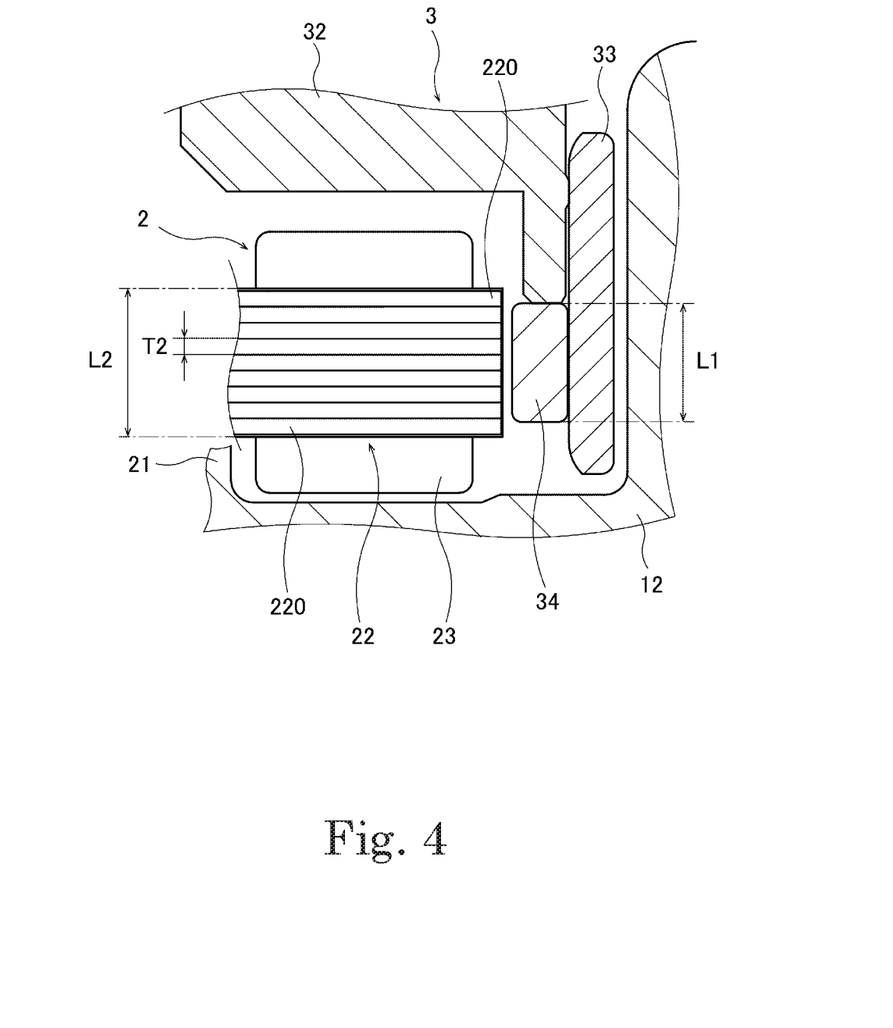
FIG. 4 is an enlarged view illustrating a portion of the spindle motor.

A detailed configuration of the spindle motor 1 of the embodiment will be described below with reference to FIGS. 2 to 4. FIG. 2 is a longitudinal sectional view illustrating the configuration of the spindle motor 1. FIG. 3 is a plan view illustrating a configuration of a stator 20 provided in the stationary unit 2 and a periphery of the stator 20. FIG. 4 is an enlarged sectional view illustrating a part of the spindle motor 1.

As illustrated in FIG. 2, the stationary unit 2 includes a stator support 21, a stator core 22, a plurality of coils 23, and a bearing unit 24. The stator 20 is constructed with the stator core 22 and the plurality of coils 23.

The stator support 21 extends in a cylindrical shape in the axial direction around the first axis 91. The stator support 21 is a part of the stationary unit 2 of the spindle motor 1, and is also a part of the base member 12.

As illustrated in FIG. 4, the stator core 22 is configured by laminating a plurality of magnetic steel plates 220 in the axial direction. In the embodiment, nine magnetic steel plates having a constant thickness ranging from 0.35 mm to 0.4 mm in the axial direction are laminated in the axial direction, thereby forming the stator core 22. The number of laminated magnetic steel plates 220 is not limited to nine, but may be eight or less or ten or more.

As illustrated in FIG. 3, the stator core 22 includes a core back 221 and a teeth unit 222.

The core back 221 is a cylindrical region centered on the first axis 91. An inner diameter D2 of the core back 221 ranges from 10 mm to 17 mm. As illustrated in FIG. 2, an inner circumferential surface of the core back 221 (stator core 22) is fixed to an outer circumferential surface of the stator support 21.

The teeth unit 222 extends radially outward from an outer circumferential portion of the core back 221. A plurality of teeth units 222 are formed at a constant pitch over a whole circumference of the core back 221. In the embodiment, twelve teeth units 222 are formed at intervals of 30° in the circumferential direction. Each teeth unit 222 has a shaft 223 and a restricting unit 224. In other words, each teeth unit 222 has a substantially T-shape in planar view. The shaft 223 extends linearly in the radial direction. The restricting unit 224 is formed at the leading end of the shaft 223 on the opposite side to the side connected to the core back 221 of the shaft 223. The restricting unit 224 extends from the leading end of the shaft 223 toward both ends in the circumferential direction.

A circumferential width T3 of the shaft 223 of the teeth unit 222 is designed to satisfy the following magnitude relationship with a radial thickness T4 of the core back 221. That is, as illustrated in FIG. 3, the radial thickness T4 of the core back 221 is larger than a half the circumferential width T3 of the shaft 223 of the teeth unit 222 (T4>(T3)/2). The radial thickness T4 of the core back 221 is smaller than the circumferential width T3 of the shaft 223 of the teeth unit 222 (T4<T3).

As illustrated in FIG. 3, a first angle (A1°) corresponding to the circumferential width of the shaft 223 of the teeth unit 222 is smaller than a second angle (A2°) corresponding to a gap between the adjacent teeth units 222, 222 (A1<A2). In other words, the first angle (A1°) corresponding to the circumferential width of a portion in which the restricting unit 224 is excluded in the teeth unit 222 is smaller than the second angle (A2°) corresponding to the circumferential gap between the adjacent teeth units 222, 222. Both the first angle (A1°) and the second angle (A2°) are a central angle with respect to the first axis 91.

The coil 23 is formed by winding a conductive wire around the shaft 223 of the teeth unit 222. As illustrated in FIG. 3, the coil 23 is provided for each teeth unit 222. In particular, the number of windings of the conductive wire wound around the shaft 223 of each teeth unit 222 ranges from 30 times to 55. A diameter of the conductive wire ranges from 0.2 mm to 0.4 mm. The coil 23 is restricted by the restricting unit 224 to prevent winding collapse.

The bearing unit 24 in FIG. 2 rotatably supports the shaft 31 on the side of the rotating unit 3. Although various known mechanisms can be adopted for the bearing unit 24, a fluid dynamic bearing mechanism is used in the embodiment.

The rotating unit 3 is formed in a substantial cup shape. As illustrated in FIG. 2, the rotating unit 3 mainly includes a shaft 31, a rotor hub 32, a yoke 33, a rotor magnet 34, and a clamper 35.

The shaft 31 is a long columnar member extending along the central axis (first axis 91) of the rotating unit 3. A lower end of the shaft is housed in the bearing unit 24.

The rotor hub 32 is a cup-shaped member in which an upper side is closed, and the shaft 31 is fixed to a central axis portion of the rotor hub 32. The rotor hub 32 can rotate with respect to the stator support portion 21 by housing the shaft 31 in the bearing unit 24. A lower portion of the rotor hub 32 extends downward in a cylindrical shape. When viewed from above, the stator core 22 is covered with the rotor hub 32.

The yoke 33 is fixed to an outer circumferential portion of the lower portion (the above cylindrical portion) of the rotor hub 32. In other words, the inner circumferential surface of the yoke 33 having the cylindrical shape is fixed to the outer circumferential surface of the rotor hub 32. For example, iron that is a magnetic material is used as a material of the yoke 33. The yoke 33 is disposed so as to protrude downward from the rotor hub 32. Thus, as illustrated in FIG. 2, a step is formed in a connection portion between the rotor hub 32 and the yoke 33.

The rotor magnet 34 is a cylindrical member, and is fixed to the inner circumferential portion of the yoke 33. More specifically, the rotor magnet 34 is fitted in and fixed to the step of the connection portion between the rotor hub 32 and the yoke 33. In the inner peripheral surface of the magnet 34, north poles and south poles are alternately magnetized in the circumferential direction. In particular, in the rotor magnet 34 of the embodiment, the inner circumferential surface is magnetized by a known method such that the total of magnetic poles becomes eight. The yoke 33 is disposed radially outside of the rotor magnet 34, whereby leakage of the magnetic flux generated from the rotor magnet 34 is prevented.

The rotor magnet 34 will be described in more detail with reference to FIGS. 3 and 4. The rotor magnet 34 of the embodiment is a neodymium bonded magnet (Nd—Fe—B BOND MAGNET). As illustrated in FIG. 3, a radial thickness T1 of the rotor magnet 34 ranges from 0.8 mm to 1.5 mm. As illustrated in FIG. 4, an axial length L1 of the rotor magnet 34 is shorter than an axial length L2 of the teeth unit 222 (L1<L2). However, the axial length L1 of the rotor magnet 34 is longer than the axial length of the stator core 22 when two of the thickness T2 of the magnetic steel plate 220 is subtracted from the axial length of the stator core 22 (L1>{L2−2×(T2)}). The stator core 22 of the embodiment is configured by laminating the nine magnetic steel plates 220 as described above. Thus, the axial length L1 of the rotor magnet 34 is longer than seven of the thickness T2 of the magnetic steel plate 220 (L1>{7×(T2)}).

As illustrated in FIGS. 2 and 4, the rotor magnet 34 is located radially outside the teeth unit 222. As illustrated in FIG. 3, the rotor magnet 34 is disposed opposite the restricting unit 224 while a distance (distance) D1 ranging from 0.17 mm to 0.40 mm is provided in the radial direction between the rotor magnet 34 and the outer circumferential surface of the restricting unit 224 of the teeth unit 222. With this configuration, magnetic attractive force is generated between each pole of the rotor magnet 34 and the teeth unit 222 of the stator core 22.

The clamper 35 in FIGS. 1 and 2 is a member that presses the magnetic disk 14 from above to fix the magnetic disk 14 to the rotor hub 32.

In the spindle motor 1 having the above configuration, when current is supplied to the coil 23 to drive the spindle motor 1, the magnetic attractive force is generated between the teeth unit 222 and each pole of the rotor magnet 34. As a result, torque is generated between the stationary unit 2 and the rotating unit 3. A torque constant Kt of the torque ranges from 6 mN·m/A to 13 mN·m/A.

A motor constant Km of the spindle motor 1 ranges from 5 mN·m/(A·√Ω) to 10 mN·m/(A·√Ω). The motor constant Km is a value defined by Km=Kt/√(R) using the torque constant Kt and a conductor resistance R of the whole of the plurality of coils 23. It can be said that the motor constant Km is an index indicating how much torque can be generated per unit space of the spindle motor 1.

In the 1.75-mm thickness disk drive device, for example, even if the spindle motor mounted on the 7-mm thickness disk drive device is thinned according to the 1.75-mm thickness disk drive device, the sufficient torque constant Kt can hardly be secured. By decreasing the diameter of the wire to increase the number of windings of the coil, the torque constant Kt can be secured while the motor is thinned. However, the wire resistance R of the coil increases. In the spindle motor having the large wire resistance R of the coil, the current at startup decreases when the spindle motor having the large wire resistance R is driven by the same power supply as compared with the spindle motor having the small wire resistance R. As a result, the torque at the startup of the spindle motor decreases, and a startup time, which is time until a rotation speed of the spindle motor reaches a rated rotation speed, is lengthened. At this point, in the spindle motor for the disk drive device, not only the sufficient torque needs to be secured, but also the startup time needs to fall within a predetermined time. For this reason, in the spindle motor 1 of the 1.75-mm thickness disk drive device 100 of the embodiment, dimensions and constants of the units are appropriately set even in a limited space such that the startup time is shortened while the sufficient torque is generated, and such that the cost does not increase.

As described above, in the spindle motor 1 of the embodiment, the dimensions and constants of the units are appropriately adjusted such that a volume of the rotor magnet 34 in which the material cost tends to increase generally can be reduced smaller than the conventional rotor magnet.

At this point, the following problem arises by merely designing the small volume of the rotor magnet 34 in order to reduce the manufacturing cost of the spindle motor 1, and consequently the manufacturing cost as a whole of the disk drive device 100. That is, for example, in the case that the axial length of the rotor magnet 34 is set shorter than the conventional axial length, a part of the magnetic flux is lost when the magnetic flux from the teeth unit 222 of the stator core 22 is received by the rotor magnet 34. For this reason, the torque generated between the stationary unit 2 and the rotating unit 3 is decreased, and a motor characteristic is degraded.

In this respect, the dimensions and the constants of the units are appropriately adjusted as described above in the spindle motor 1 of the embodiment. For this reason, the number of windings of the conductive wire wound around the shaft 223 of the teeth unit 222 can be increased larger than the conventional number of windings, or the thickness of the conductive wire wound around the shaft 223 can be increased larger than the conventional thickness. In other words, instead of reducing the volume of the rotor magnet 34 smaller than the conventional volume, the magnetic flux density of the teeth unit 222 is increased by increasing the current passed through the coil 23. Consequently, the magnetic attraction force generated between each pole of the rotor magnet 34 and the teeth unit 222 of the stator core 22 can be maintained in a sufficiently large state. As a result, the manufacturing cost can be reduced without impairing the motor characteristic.

As described above, in the spindle motor 1 of the embodiment, the axial length of the rotor magnet 34 is shorter than the conventional axial length, so that the volume of the rotor magnet 34 that tends to become expensive is suppressed. A wider space where the conductive wire is wound is ensured by ensuring a longer radial length of the shaft 223 of the teeth unit 222. The first angle (A1°) corresponding to the circumferential width of the shaft 223 of the teeth unit 222 is smaller than the second angle (A2°) corresponding to the gap between the adjacent teeth units 222, 222 (A1<A2), so that a wider space can be secured around the shaft 223.

According to this configuration, the volume of the rotor magnet 34 can be kept small, and the spindle motor 1 can be manufactured at low cost. A large number of windings of the conductive wire wound around the teeth unit 222 can be secured, or the thickness of the conductive wire wound around the teeth unit 222 can be increased. Thus, the motor characteristic of the spindle motor 1 can be maintained even if the volume of the rotor magnet 34 is smaller than the conventional volume. Furthermore, because the volume of the rotor magnet 34 can be reduced, when the rotor magnet 34 is constructed with a plurality of magnets arranged in the circumferential direction, exciting force can be kept small even if radial mounting positions of the plurality of magnets fluctuate. This enables the improvement of the motor characteristic.

In the embodiment, the number of laminated magnetic steel plates 220 constituting the stator core 22 and the thickness T2 of each magnetic steel plate 220 are suitably configured as described above. According to this configuration, the radial magnetic flux can favorably be generated in the teeth unit 222 of the stator core 22. The manufacturing cost of the spindle motor 1 can be reduced using the magnetic steel plate 220 having the thickness that is easy to obtain.

The axial length L1 of the rotor magnet 34 of the embodiment is longer than the axial thickness of the seven (=9−2) magnetic steel plates 220. According to this configuration, the amount of magnetic flux entering the magnetic steel plate 220 from the rotor magnet 34, in particular, the uppermost and lowermost magnetic steel plates 220 from the rotor magnet 34, can be prevented from becoming extremely small. The axial length L1 of the rotor magnet 34 can be designed short within a range in which the amount of magnetic flux entering the magnetic steel plate 220 from the rotor magnet 34 is not extremely decreased. Thus, the manufacturing cost of the spindle motor 1 can be reduced without significantly impairing the motor characteristic.

An inner diameter D2 of the core back 221 of the embodiment is set within the above numerical range. According to this configuration, the radial length of the teeth unit 222 can sufficiently be secured. Thus, the number of windings of the conductive wire wound around the teeth unit 222 can further be increased, or the thicker conductive wire can be wound around the teeth unit 222.

In the embodiment, the number of windings of each of the coils 23 is set to the above numerical range. According to this configuration, the number of windings of the coil 23 can sufficiently be secured. Thus, the motor characteristic can be maintained well even if the volume of the rotor magnet 34 is designed to be reduced.

In the embodiment, the diameter of the conductive wire constituting the coil 23 is set to the above numerical range. According to this configuration, even if the volume of the rotor magnet 34 is designed to be reduced, the amount of magnetic flux entering the teeth unit 222 of the stator core 22 can be prevented from becoming extremely small. Thus, the motor characteristic of the spindle motor 1 can favorably be maintained.

In the embodiment, the radial thickness T4 of the core back 221 is set to the above numerical range in relation to the circumferential width T3 of the shaft 223 of the teeth unit 222. According to this configuration, the radial thickness T4 of the core back 221 can be designed to be thin. Consequently, the number of windings of the conductive wire wound around the shaft 223 of the teeth unit 222 can be increased or the thicker conductive wire can be wound around the shaft 223.

The radial width of the restricting unit 224 of the teeth unit 222 of the embodiment is narrower than the conventional width. In the embodiment, the magnetic flux entering the teeth unit 222 (restricting unit 224) from the rotor magnet 34 decreases due to the setting of the short axial length L1 of the rotor magnet 34, so that the radial width of the restricting unit 224 can be narrowed. More particularly, conventionally the restricting unit 224 needs to have the large radial width to some extent, In the embodiment in order to prevent the magnetic flux entering the restricting unit 224 from the rotor magnet 34 from reaching a saturated state. On the other hand, in the embodiment, the radial width of the restricting unit 224 can be thinned because the magnetic flux entering the restricting unit 224 from the rotor magnet 34 is smaller than the conventional magnetic flux. As a result, the axial dimension of the shaft portion 223 can be set much longer, and the number of windings of the conductive wire wound around the shaft 223 of the teeth unit 222 can be increased or the thicker conductive wire can be wound around the shaft 223.

In the embodiment, the total of magnetic poles in the whole circumference of the rotor magnet 34 is eight, and the total of the plurality of teeth units 222 for one stator core 22 is twelve. According to this configuration, what is called the 8-pole 12-slot type spindle motor 1 having high demand in a market can be manufactured at low cost without impairing the motor performance.

The disk drive device 100 including the spindle motor 1 having the above configuration is disclosed in the embodiment. According to this configuration, the spindle motor 1 can be manufactured at low cost without impairing the motor performance, so that a good product can be manufactured at low cost as the whole of the disk drive device 100.

<3. Modifications>

Although the exemplary embodiment of the present disclosure is described above, the present disclosure is not limited to the above embodiment.

In the spindle motor 1 of the above embodiment, the total of magnetic poles in the whole circumference of the rotor magnet 34 is eight, and the total of the plurality of teeth units 222 is twelve. Alternatively, the total of magnetic poles in the whole circumference of the rotor magnet 34 may be six and the total of the plurality of teeth units 222 may be nine. In this case, what is called a 6-pole 9-slot type spindle motor having high demand in the spindle motor for the disk drive device can be manufactured at low cost without impairing motor performance.

In the above embodiment, the rotor magnet 34 is the cylindrical member, and the N poles and the S poles are alternately magnetized in the circumferential direction on the inner circumferential surface of the rotor magnet 34. Alternatively, for example, a plurality of individually-magnetized magnets may alternately be bonded to the inner circumferential portion of the yoke 33.

In the above embodiment, the rotating body is the magnetic disk 14. However, the rotating body is not limited to the magnetic disk 14. For example, instead of the magnetic disk 14, the rotating body may be an optical disk. Alternatively, the rotating body may be a flywheel. For example, the flywheel may be a light source mounted thereon, and scanning may be performed with light by rotationally driving the flywheel using the spindle motor. For example, the flywheel can be used to perform virtual reality display on a display device.

Each element appearing in the embodiment and the modifications may appropriately be combined within a range in which inconsistency is not generated.

For example, the present disclosure can be used in the spindle motor and a rotating body drive device including the spindle motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A spindle motor for a rotating body drive device, the spindle motor comprising:
   a stationary unit including a stator; and
   a rotating unit including a magnet opposed to the stator, the rotating unit being supported so as to be rotatable about a central axis with respect to the stationary unit; wherein
   the stator includes:
      a stator core including a tubular core back centered on the central axis and a plurality of teeth units extending radially outward from an outer circumferential portion of the core back; and
      a plurality of coils defined by a conductive wire wound around each of the teeth units;
   an axial length of the magnet is shorter than an axial length of one of the teeth units;
   a first angle corresponding to a circumferential width of one of the teeth units is smaller than a second angle corresponding to a circumferential pitch of adjacent ones of the teeth units;
   the magnet is a neodymium bonded magnet;
   a radial thickness of the magnet ranges from about 0.8 mm to about 1.5 mms;
   a radial distance between a radially inside surface of the magnet and an outer end surface of the one of the teeth units ranges from about 0.17 mm to about 0.40 mm;
   a torque constant of torque generated between the stationary unit and the rotating unit ranges from about 6 mN·m/A to about 13 mN·m/A; and
   a motor constant of the spindle motor ranges from about 5 mN·m/(A·√Ω) to about 10 mN·m/(A·√Ω).

2. The spindle motor according to claim 1, wherein
   the stator core includes a plurality of magnetic steel plates laminated in an axial direction; and
   a number of the plurality of magnetic steel plates is 9, and an axial thickness of each of the plurality of magnetic steel plates ranges from about 0.3 mm to about 0.4 mm.

3. The spindle motor according to claim 1, wherein
   the stator core includes a plurality of magnetic steel plates laminated in an axial direction; and
   an axial length of the magnet is longer than an axial length of the stator core when a thickness of the two magnetic steel plates is subtracted from the axial length of the stator core.

4. The spindle motor according to claim 1, wherein an inner diameter of the core back ranges from about 10 mm to about 17 mm.

5. The spindle motor according to claim 1, wherein a number of windings of each of the plurality of coils ranges from 30 times to 55 times.

6. The spindle motor according to claim 1, wherein a diameter of the conductive wire ranges from about 0.20 mm to about 0.40 mm.

7. The spindle motor according to claim 1, wherein
   each of the teeth units includes a shaft extending in the radial direction; and
   a thickness in the radial direction of the core back is larger than a half of the circumferential width of the shaft of the teeth unit, and is smaller than the circumferential width of the shaft of each of the teeth units.

8. The spindle motor according to claim 1, wherein a total of the magnetic poles of the magnet is 8, and a total of the plurality of teeth units is 12.

9. The spindle motor according to claim 1, wherein a total of the magnetic poles of the magnet is 6 and a total of the plurality of teeth units is 9.

10. A disk drive device comprising:
    the spindle motor according to claim 1;
    a 3.5-inch and 1.75-mm thickness disk rotated by the spindle motor;
    an access unit that performs at least one of reading and writing information from and in the disk;
    a clamper that fixes the disk to the rotating unit; and
    a housing that houses the spindle motor, the disk, the access unit, and the clamper.

* * * * *